United States Patent
Urban et al.

(10) Patent No.: US 10,287,389 B2
(45) Date of Patent: May 14, 2019

(54) FURAN-BASED AMINES AS CURING AGENTS FOR EPOXY RESINS IN LOW VOC APPLICATIONS

(71) Applicant: SIKA TECHNOLOGY AG, Baar (CH)

(72) Inventors: Claus Urban, Ludwigsburg (DE); Nina Schäffeler, Rot an der Rot (DE)

(73) Assignee: SIKA TECHNOLOGY AG, Baar (CH)

(*) Notice: Subject to any disclaimer, the term of this patent is extended or adjusted under 35 U.S.C. 154(b) by 103 days.

(21) Appl. No.: 15/121,155

(22) PCT Filed: Feb. 24, 2015

(86) PCT No.: PCT/EP2015/053803
§ 371 (c)(1),
(2) Date: Aug. 24, 2016

(87) PCT Pub. No.: WO2015/124792
PCT Pub. Date: Aug. 27, 2015

(65) Prior Publication Data
US 2017/0009005 A1  Jan. 12, 2017

(30) Foreign Application Priority Data

Feb. 24, 2014 (EP) .................................. 14156398

(51) Int. Cl.
C08G 59/18 (2006.01)
C08G 59/50 (2006.01)
C08G 59/22 (2006.01)
C09D 163/00 (2006.01)
C09J 163/00 (2006.01)

(52) U.S. Cl.
CPC ....... C08G 59/5046 (2013.01); C08G 59/184 (2013.01); C08G 59/223 (2013.01); C09D 163/00 (2013.01); C09J 163/00 (2013.01)

(58) Field of Classification Search
None
See application file for complete search history.

(56) References Cited

U.S. PATENT DOCUMENTS

| | | | | |
|---|---|---|---|---|
| 2,750,395 A * | 6/1956 | Phillips | ................ | C07D 303/16 549/547 |
| 2,890,194 A * | 6/1959 | Phillips | ................ | C08G 59/24 525/438 |
| 2,995,581 A * | 8/1961 | Garber | ................ | C08G 59/5046 528/417 |
| 3,018,262 A * | 1/1962 | Schroeder | ......... | C08G 59/4007 427/393.2 |
| 3,055,914 A * | 9/1962 | Garber | ................ | C07D 307/12 549/472 |
| 4,981,926 A * | 1/1991 | Pham | ................ | C08G 59/688 525/486 |
| 5,208,317 A * | 5/1993 | Pham | ................ | C08G 59/688 525/486 |
| 5,405,688 A * | 4/1995 | Decker | ................ | C08L 63/00 428/297.4 |
| 6,153,719 A * | 11/2000 | Abbey | ................ | C08F 283/10 525/529 |
| 6,242,083 B1 * | 6/2001 | McGrail | ................ | C08G 59/38 428/297.4 |
| 6,572,971 B2 * | 6/2003 | Martin | ................ | B32B 7/12 428/414 |
| 6,632,893 B2 * | 10/2003 | Konarski | ........... | C08G 59/4014 257/793 |
| 7,037,958 B1 * | 5/2006 | Hansen | ................ | B05D 7/54 523/428 |

(Continued)

FOREIGN PATENT DOCUMENTS

WO   2013/090136 A2   6/2013

OTHER PUBLICATIONS

Xiaodun He et al. "Evaluation of Furfurylamines as Curing Agents for Epoxy Resins", Journal of Polymer Science, Polymer Chemistry Edition, Interscience Publishers, New York, NY, US, vol. 30, No. 4, Mar. 30, 1992. pp. 533-542.*

Gandini, Alessandro et al, "Furans in Polymer Chemistry," 1997, pp. 1203-1379, vol. 22, Prog. Polym. Sci.

Gandini, Alessandro, "Furans as offspring and polysaccharides and progenitors of a family of remarkable polymers: a review of recent progress," Journal, Sep. 4, 2009, pp. 245-251, vol. 1, Poly Chemistry.

Feb. 24, 2018 Office Action in Chinese Application No. 201580016955.9.

(Continued)

*Primary Examiner* — Megan McCulley
(74) *Attorney, Agent, or Firm* — Oliff PLC

(57) ABSTRACT

A room temperature or low temperature curable epoxy formulation including a) an epoxy component including at least one epoxy resin and b) a hardener component including at least one compound of formula (I)

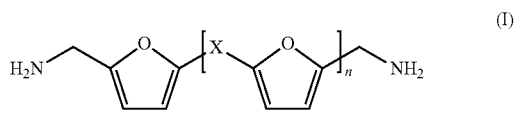

(I)

wherein X is a divalent hydrocarbon group, which optionally contains one or more heteroatoms, and n is 0, 1, 2 or 3, preferably 0 or 1, and/or at least one epoxy-amine adduct, which is a reaction product of the compound of formula (I) and an epoxy compound selected from at least one of a monoepoxide and a polyepoxide, as a curing agent. The compounds of formula (I) and the epoxy-amine adduct are suitable as curing agents for epoxy formulations which provide good surface properties and good cure speed, even at low temperature curing. In particular, amine blushing can be avoided or reduced to a large extent, when these curing agents are used.

11 Claims, No Drawings

(56) References Cited

U.S. PATENT DOCUMENTS

| | | | | |
|---|---|---|---|---|
| 7,163,973 B2* | 1/2007 | Ahsan | C08G 59/621 | 257/789 |
| 2004/0169162 A1* | 9/2004 | Xiao | C08G 59/184 | 252/500 |
| 2005/0171237 A1* | 8/2005 | Patel | C09D 11/101 | 523/160 |
| 2006/0293172 A1* | 12/2006 | Rubinsztajn | B01J 31/0237 | 502/155 |
| 2009/0018300 A1* | 1/2009 | Bloom | C08G 61/12 | 527/102 |
| 2012/0232294 A1* | 9/2012 | Schaub | C07C 209/16 | 549/495 |
| 2014/0005302 A1* | 1/2014 | Briand | C08K 3/34 | 523/402 |
| 2014/0370298 A1* | 12/2014 | Owusu-Adom | C08L 63/00 | 428/414 |
| 2015/0203629 A1* | 7/2015 | Ortelt | C08K 5/1535 | 428/418 |
| 2016/0152764 A1* | 6/2016 | Jeol | C08G 59/245 | 156/330 |
| 2016/0185896 A1* | 6/2016 | Panchenko | C08G 59/5046 | 523/400 |

OTHER PUBLICATIONS

Feb. 26, 2018 Office Action issued in European Application No. 15707085.5.

Feb. 2, 2019 Office Action issued in Chinese Application No. 201580016955.9.

\* cited by examiner

FURAN-BASED AMINES AS CURING AGENTS FOR EPOXY RESINS IN LOW VOC APPLICATIONS

TECHNICAL FIELD

The invention relates to curable epoxy formulations comprising furan-based curing agents, the use of the furan-based curing agents, methods for preparing cured articles based on the epoxy formulations and products obtainable therefrom.

BACKGROUND OF THE INVENTION

A wide variety of amines are used as curing agents for epoxy resins. Most of these amine curing agents contain primary amino groups. These amines are prone to react with carbon dioxide from the air forming carbamates (carbamatization) which represents an undesirable side reaction in such epoxy formulations. As a result, the cured epoxy formulation may have an aesthetically unsatisfactory surface often characterized by a waxy or oily surface layer, a white surface layer or spots of salt deposits occasionally accompanied by tackiness and incomplete surface curing. In some instances the marks are not visible but occur on contact with high humidity or water. These effects are generally known as "amine blushing" or "water spotting".

This problem is even more severe when curing is carried out at low temperatures and high humidities since curing speed is reduced so that the available time for carbamatization side reactions by amines migrating to the surface is increased.

Polyamines having secondary amine groups could be used as curing agent since secondary amines are as much not subject to carbamatization but these polyamines are difficult to obtain and often very expensive. Another option is to use epoxy-amine adducts as curing agent, however these adducts usually have a high viscosity so that a dilution by solvents or benzyl alcohol is necessary to achieve an appropriate workability. As a result, according to the prior art, accelerators or diluents, for instance alcohols such as benzyl alcohol, are often added to the epoxy formulation comprising amine curing agents in order to avoid or reduce amine blushing.

Thus, commercial amine cured epoxy formulations are typically formulated with benzyl alcohol which is often used as a co-solvent in epoxy resins formulations in order to improve physical properties and appearance, in particular for low temperature curing applications. However, benzyl alcohol has its own disadvantages, since benzyl alcohol is a volatile organic compound (VOC) so that high VOC formulations are obtained, and large amounts of benzyl alcohol may have a negative impact on the mechanical properties of the cured epoxy resin.

In view of environmental and health concerns, low VOC epoxy formulations are advantageous so that it would be desirable to reduce or avoid benzyl alcohol in such formulations. In order to reduce the dependency on raw materials derived from petrochemical feedstock it is further desirable to have ingredients such as curing agents for use in epoxy formulations which can be derived from renewable resources.

Furan-based amines are such compounds derived from natural feedstock and have been previously described in the literature, e.g. A. Gandini, "Furans as offspring of sugars and polysaccharides and progenitors of a family of remarkable polymers: a review of recent progress", Polym. Chem., 2010, 1, 245-251; and A. Gandini et al., Furans in Polymer Chemistry, Progr. Polym. Sci., 1997, 22, 1203.

Xiaodun He et. al., Journal of Polymer Science, Polymer Chemistry Edition, NY, US, vol. 30, no. 4, 30 Mar. 1992, pages 533-542, describe the evaluation of furfurylamines as curing agents for epoxy resins.

SUMMARY OF THE INVENTION

It is therefore an object to surmount the disadvantages of the prior art as discussed above. In particular, the object of the invention was to provide low VOC epoxy formulations or VOC-free formulations which have a suitable curing speed so that room temperature curing and even low temperature curing is possible and amine blushing is avoided or significantly reduced. This aim should be preferably achieved with benzyl alcohol free epoxy formulations. Moreover, the epoxy formulation should be more environmentally friendly in that ingredients derivable from renewable resources are used and it can be formulated as a low VOC or VOC-free epoxy formulation.

Surprisingly, the inventors have recognized that particular furan-based curing agents and/or adducts thereof work particular well in benzyl alcohol-free or low VOC epoxy formulations and exhibit good curing speed and good surface properties of the cured product, even when cured at low temperatures (e.g. 8° C.). This is a distinct advantage and a property not usually seen in primary diamine curing agents, irrespective of whether they are based on a petrochemical feedstock or a natural feedstock.

Accordingly, the present invention is related to a room temperature or low temperature curable epoxy formulation comprising
a) an epoxy component comprising at least one epoxy resin and
b) a hardener component comprising at least one compound of formula (I)

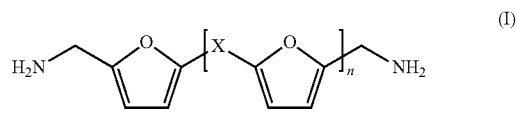

(I)

wherein X is a divalent hydrocarbon group, which optionally contains one or more heteroatoms, and n is 0, 1, 2 or 3, preferably 0 or 1, and/or at least one epoxy-amine adduct, which is a reaction product of the compound of formula (I) and an epoxy compound selected from at least one of a monoepoxide and/or a polyepoxide, as a curing agent.

The compounds of formula (I) are derivable from natural resources. It was surprising that these compounds, even though they were primary diamines, and adducts thereof provided without using benzyl alcohol surfaces with good appearance and with very little or no carbamatization in combination with a good curing speed, even at low temperatures. Films with glossy and defect-free surfaces were obtained. Thus, it is possible to provide a low VOC epoxy or VOC-free formulation which is curable at ambient temperature or even at low temperatures. This is advantageous for applications in cold places where heating is not possible or desirable.

In particular the reactivity of the bridged di-furan amines was higher and the curing speed faster than that of the standard curing agents used. The final hardness was similar to standard curing agents without benzyl alcohol and higher compared to systems with benzyl alcohol in the hardener.

The invention also relates to the use of the compounds of formula (I) or the adducts thereof as room temperature or low temperature curing agent in epoxy formulations, in particular low VOC or VOC-free epoxy formulations, methods of preparing cured articles by coating or adhering or by forming composites with these epoxy formulations, products derived therefrom and to the adducts of the compounds of formula (I) with epoxy resins. Preferred embodiments are given in the dependent claims and the following description where the invention is described in detail.

DETAILED DESCRIPTION OF THE INVENTION

Compound designations beginning with "poly" followed by a functional group such as polyamine, polyepoxide or polyglycidyl ether refer to compounds having at least two of these functional groups. For instance, a polyepoxide is a compound having at least two epoxy groups, and a polyol is a compound having at least two hydroxyl groups.

Primary amino group means an $NH_2$ group bonded to an organic radical, and secondary amino group means an NH group bonded to two organic radicals, which may be combined to form a ring. Accordingly, a primary amine is a compound having a primary amino group, a primary diamine is a compound having two primary amino groups.

A heteroatom is used in organic chemistry to refer to an atom which is different from carbon and hydrogen. Preferred examples of heteroatoms according to the present invention are oxygen, nitrogen, sulfur, phosphorus, and chlorine, in particular oxygen and nitrogen.

A hydrocarbon group is a group including carbon atoms and hydrogen atoms. A divalent hydrocarbon group may be aliphatic, cycloaliphatic or aromatic or a combination thereof. Examples of hydrocarbon groups are linear or branched alkyl, alkenyl, alkynyl, cycloalkyl and aromatic groups such as phenyl or combinations thereof for monovalent hydrocarbon groups and the corresponding divalent hydrocarbon groups.

A room temperature curable epoxy formulation refers to an epoxy formulation which is suitable for curing at room temperature or ambient temperature, for instance at a temperature of less than 50° C., preferably less than 40° C., more preferably less than 30° C. A low temperature curable epoxy formulation refers to an epoxy formulation which is suitable for curing at low temperatures, for instance at a temperature of less than 15° C., preferably less than 10° C. Accordingly, room temperature curing agents or low temperature curing agents are curing agents which can be used in room temperature curable formulations or low temperature curable formulations, respectively.

No widely supported definition of "volatile organic compound" (VOC) exists; VOC definitions may vary from country to country and from regulation to regulation. VOC as used herein, however, is to be understood as used by the German Committee for Health-related Evaluation of Building Products, AgBB (Ausschuss für die gesundheitliche Bewertung von Bauprodukten) which has presented a procedural scheme for health-related evaluation of VOC emissions from building products used for application indoors. Within this scheme, volatile organic compounds include compounds within the retention range of $C_6$ to $C_{16}$, which are considered both as individual substances and in calculating a sum parameter following the TVOC concept (TVOC: Total Volatile Organic Compounds; defined as the sum of the concentration of all individual substances with concentrations equal to or greater than 5 µg/m³ within the retention range $C_6$-$C_{16}$). Hence, as used herein VOC content refers to $TVOC_3$ as determined according to the AgBB evaluation scheme of 2010 (AgBB-Bewertungsschema von 2010) which definition is in accordance with ISO 16000/6, which is available e.g. from http://www.umweltbundesa-mt.de/sites/default/files/medien/377/dokumente/agbb-evaluation-scheme2010.pdf.

Active amine hydrogen or amine hydrogen refers to a hydrogen of a —NH group of a compound. For instance, a primary amine group has two active hydrogens. The amine hydrogen to epoxy equivalent ratio as used herein refers to the ratio of amine hydrogen equivalents and the epoxy equivalents of the chemicals of respective functionality involved.

The epoxy formulations of the invention are usually provided as a multi-component formulation, in particular a two component formulation, comprising an epoxy component containing the at least one epoxy resin, and a hardener component comprising the at least one curing agent, as is known to the skilled persons. The two components are stored separately. Before use, the epoxy component and the hardener component are mixed in a suitable proportion which initiates the curing process. The mixture is then applied on a desired location in a desired shape within the pot life of the mixture, and the applied epoxy formulation will then cure at the ambient temperature to obtain the cured product.

The room temperature or low temperature curable epoxy formulation of the invention comprises an epoxy component comprising at least one epoxy resin.

The formulation may comprise one epoxy resin or a mixture of two or more epoxy resins. Such epoxy resins are commercially available. Epoxy resins conventionally used in epoxy chemistry are suitable as the epoxy resin. These are obtained by methods known in the art, for example from oxidation of the corresponding olefins or from reaction of epichlorohydrin with the corresponding polyols, polyphenols, or amines.

The epoxy resin is a curable epoxy resin comprising two or more epoxy groups. Thus, the epoxy resins are polyepoxides. The epoxy resin used is preferably a liquid epoxy resin. The epoxy resin may be selected from aromatic epoxy resins, alicyclic epoxy resins, aliphatic epoxy resins and combinations thereof. The epoxy resins are often used in combination with an optional epoxyfunctional reactive diluent which may be monofunctional as described below.

Examples of aromatic epoxy resins include, but are not limited to, polyglycidyl ether compounds of polyphenols, such as hydroquinone, resorcinol, bisphenol A, bisphenol F, 4,4'-dihydroxybiphenyl, novolac, tetrabromobisphenol A, 2,2-bis(4-hydroxyphenyl)-1,1,1,3,3,3-hexafluoropropane, and 1,6-dihydroxy-naphthalene.

Examples of alicyclic epoxy resins include, but are not limited to, polyglycidyl ethers of polyols having at least one alicyclic ring, or compounds obtained by epoxidizing compounds including a cyclohexene ring, cyclopentene ring with an oxidizer. Some specific examples include, but are not limited to hydrogenated bisphenol A diglycidyl ether; hydrogenated bisphenol F diglycidyl ether; cyclohexane dimethanol diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexyl-methyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; and di-2-ethylhexyl epoxyhexahydrophthalate.

Examples of aliphatic epoxy resins include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some specific examples include, but are not limited to glycidyl ethers of polyols, such as 1,4-butanediol diglycidyl ether; neopentyl glycol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; and diglycidyl esters of aliphatic long-chain dibasic acids. Other examples of aliphatic epoxy resins are compounds obtained by epoxidizing unsaturated aliphatic compounds with an oxidizer, for example epoxidized unsaturated fatty acids.

In a preferred embodiment the epoxy resin is an aromatic epoxy resin. Especially suitable are epoxy resins of formula (III), Optionally, the epoxy component may further include a reactive diluent. Reactive diluents are compounds that participate in a chemical reaction with the hardener component during the curing process and become incorporated into the cured composition. Reactive diluents can also be used to vary the viscosity and/or cure properties of the curable compositions for various applications. For some applications reactive diluents can impart a lower viscosity to influence flow properties, extend pot life and/or improve adhesion properties of the curable compositions. If present, the reactive diluent may be contained, for instance in an amount of less than 70 percent by weight, based on the total weight of the epoxy component, e.g. from 0 to 70% by weight, preferably from 0 to 30% by weight.

Suitable reactive diluents are mono- and polyepoxides such as, for example, glycidyl ethers of monohydric or polyhydric phenols and aliphatic or cycloaliphatic alcohols, such as in particular glycidyl ethers of monools, diols or polyols, as well as also in particular phenyl glycidyl ether, cresyl glycidyl ether, p-n-butyl phenyl glycidyl ether, p-tert butyl phenyl glycidyl ether, nonylphenyl glycidyl ether, allyl glycidyl ether, butyl glycidyl ether, hexyl glycidyl ether, 2-ethylhexyl glycidyl ether, glycidyl ester of a synthetic saturated monocarboxylic acid of highly branched $C_{10}$ isomers (commercially available e.g. as Cardura™ E10 from Momentive) and glycidyl ethers of natural alcohols such as, for example, $C_8$ to $C_{10}$ alkyl glycidyl ethers or $C_{12}$ to $C_{14}$ alkyl glycidyl ethers; 1,4-butanediol diglycidylether, 1,6-hexanediol diglycidylether, cyclohexane dimethanol diglycidylether, neopentylglykol diglycidether, polypropylene glycol diglycidylether; glycerol triglycidylether, trimethylolpropane triglycidylether, polyoxypropylene glycol trigly-

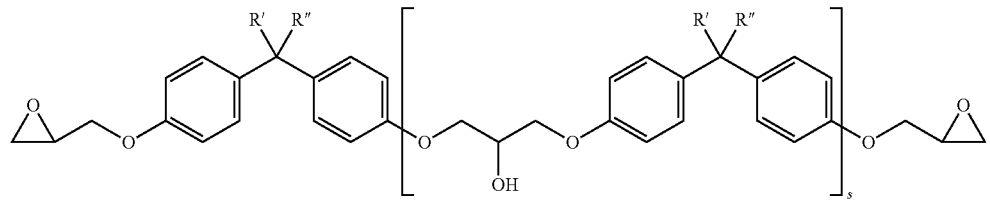

wherein R' and R" independently from each other represent hydrogen, $C_1$-$C_4$ alkyl such as methyl and ethyl, trifluoromethyl or aryl such as phenyl, and s is on average from 0 to 2, preferably from 0 to 1 and in particular from 0 to 0.2, or mixture of two or more resins of formula (III). These epoxy resins usually represents liquid epoxy resins.

Particularly preferred are epoxy resins of formula (III) wherein R' and R" are both H (bisphenol F-diglycidylether), $CH_3$ (bisphenol A-diglycidylether), $CF_3$ or phenyl or wherein R' is $CH_3$ and R" is phenyl or ethyl. Most preferred are diglycidyl ether of bisphenol A and bisphenol F and mixtures thereof.

Epoxy resins of formula (III) are commercially obtainable, e.g. under the trade names Araldite® from Huntsman, D.E.R.® from Dow, Epikotefrom Momentive, Epalloy® from CVC, Chem Res® from Cognis (BASF) or Beckopox® from Allnex.

Further examples are epoxy resins of formula (III) as described above except that the index s is on average from more than 2 to 20, preferably more than 2 to 12. Such epoxy resins are usually solid epoxy resins. As mentioned above, the use of liquid epoxy resins is more preferable.

cidylether, triglycidyl ether of castor oil, polyglycerol triglycidylether; pentaerythritol tetraglycidether.

According to the intended purpose, the epoxy component may comprise further additives. Examples thereof will be described below.

The room temperature or low temperature curable epoxy formulation of the invention further comprises a hardener component comprising at least one compound of formula (I) and/or at least one epoxy-amine adduct, which is a reaction product of the compound of formula (I) and an epoxy resin, as a curing agent. The compound of formula (I) has the following formula

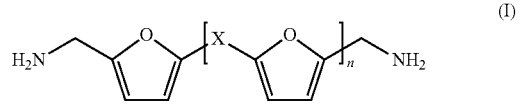

wherein X is a divalent hydrocarbon group, which optionally contains one or more heteroatoms, and n is 0, 1, 2 or 3. The index n is preferably 0 or 1, more preferably 1.

The divalent hydrocarbon group, which optionally contains one or more heteroatoms, of formula (I) is preferably a divalent hydrocarbon group having 1 to 21, preferably 1 to 7, more preferably 1 to 4 carbon atoms, which optionally contains one or more heteroatoms. Examples of the optional one or more heteroatoms which may be the same or different are oxygen, nitrogen, sulfur, phosphorus, and chlorine, in particular oxygen and nitrogen. The heteroatoms may be contained in the hydrocarbon group in form of functional groups or units such as ether, ester or primary, secondary or tertiary amines groups or units, respectively.

The group X is preferably a linear or branched alkylene group, which may include one, two or more ether linkages (—O—), one, two or more ester linkages (—OC(O)—) and/or one or more substituents such as alkyl, e.g. $C_1$-$C_6$-alkyl, cycloalkyl, e.g. cyclohexyl, a heterocyclic group, which may be substituted, such as furanmethanamine, or aryl, such as phenyl, which may be substituted; a cycloalkylene group, which may have one or more substituents such as alkyl; or an arylene group, such as a phenylene group, which may have one or more substituents such as alkyl; or combinations thereof. Thus, group X may be an aliphatic or aromatic residue, an ester or diester chain or a monoether or polyether chain.

Examples of suitable compounds of formula (I) or formula (II) discussed below, respectively are:

In a particular preferred embodiment the compound of formula (I) is a compound of formula (IV) designated 2,5-Bis(aminomethyl)furan

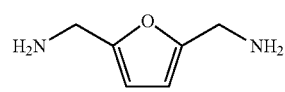

(IV)

or formula (II)

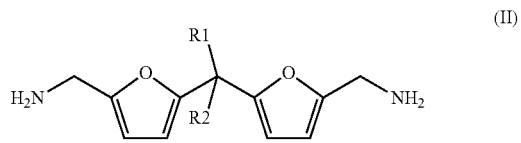

(II)

wherein $R^1$ and $R^2$ are the same or different and selected from the group consisting of hydrogen, an alkyl group, preferably having from 1 to 7 C-atoms, preferably 1 to 3 C-atoms, which may be substituted, a cycloalkyl group, which may be substituted, a heterocyclic group, which may be substituted, such as furanmethanamine, and an aryl group, preferably phenyl, which may be substituted.

| Compounds of formula (I) and (II) | | CAS number |
|---|---|---|
| (IV) structure | | 2213-51-6 |
| (II) structure | R1 = R2 = H | 90398-91-7 |
| | R1 = H, R2 = Me | 88768-53-0 |
| | R1 = H, R2 = Ph | 147641-85-8 |
| | R1 = H, R2 = iPr | 147641-84-7 |
| | R1 = H, R2 = Pr * HCl | 147628-93-1 |
| | R1 = H, R2 = 4-NO$_2$Ph | 1028745-28-9 |
| | R1 = H, R2 = Furanmethanamine | 1028745-38-1 |
| | R1 = H, R2 = 4-BrPh | 1028745-23-4 |
| | R1 = H, R2 = 4-ClPh | 790179-55-4 |
| | R1 = H, R2 = 2-HOPh | 756448-14-3 |
| | R1 = H, R2 = 2-NO$_2$Ph | 752177-47-2 |
| | R1 = H, R2 = 3-NO$_2$Ph | 726693-70-5 |
| | R1 = H, R2 = Hex | 890436-00-7 |
| | R1 = H, R2 = Pen | 852570-55-9 |
| | R1 = H, R2 = Et *HCl | 781589-29-5 161032-88-8 |
| | R1 = R2 = Me | 90398-97-3 |
| | R1 = Me R2 = Pen | 1268365-42-9 |
| | R1 = Me R2 = Et | 777828-73-6 |
| | R1 = Me R2 = Ph *2HCl | 701904-78-1 161032-89-9 |
| | R1 = Me R2 = Pr | 159188-98-4 |
| | R1 = Me R2 = Bu | 147641-86-9 |
| | R1 = Me R2 = CH$_2$Ph | 284487-03-2 |
| (5,5'-(oxybis(methylene))bis(furan-5,2-diyl))dimethanamine | | 131729-21-0 |

Examples of substituents with which the alkyl group may be substituted are cycloalkyl and aryl such as phenyl. Examples of substituents with which the cycloalkyl or the aryl group, such as phenyl, may be substituted are $C_1$-$C_4$-alkyl, $NO_2$, CN, Cl or Br. In one embodiment, $R^1$ and $R^2$ are not both hydrogen.

Preferred examples of groups $R^1$ and $R^2$ in formula (II) which may be the same or different are hydrogen, methyl, ethyl, n-propyl, isopropyl, n-butyl, isobutyl, pentyl, hexyl, benzyl, or phenyl, which may be substituted. In one embodiment $R^1$ and $R^2$ may not be both hydrogen.

More preferred are compounds of formula (II), wherein $R^1$ and $R^2$ are as follows:

| $R^1$ | $R^2$ | |
|---|---|---|
| H | H | (IIa) |
| H | $CH_3$ | (IIb) |
| H | $C_5H_6$ | (IIc) |
| $CH_3$ | $CH_3$ | (IId) |
| $CH_3$ | $C_2H_5$ | (IIe) |
| $CH_3$ | $CH_2CH(CH_3)_2$ | (IIf) |

The most preferred compound is the compound of formula (II), wherein $R^1$ and $R^2$ are both methyl (compound of formula (IId), designated isopropylidene-5,5'-bis(furfurylamine) (IPFA).

The compounds of formula (I) and (II), respectively, are obtainable from renewable resources and can be prepared according to known procedures, see e.g. the literature of Gandini cited above and references cited therein. For instance, the compounds of formula (II), in particular (IIa) to (IIf), can be prepared by coupling furfurylamine with the corresponding aldehydes or ketones, wherein amine protecting groups may be used.

Alternatively or in addition, the compound of formula (I), the hardener component may comprise at least one epoxy-amine adduct, which is a reaction product of the compound of formula (I) and an epoxy compound selected from at least one of a monoepoxide and a polyepoxide, as a curing agent. The compound of formula (I) and preferred embodiments thereof have been described above which equally apply for the compound of formula (I) which is used for preparing the epoxy-amine adduct. In particular, it is preferred that the epoxy-amine adduct is a reaction product of the compound of formula (II) or (IV) and an epoxy resin, wherein it is particularly preferred that the compound of formula (II) is isopropylidene-5,5'-bis(furfurylamine).

The epoxy compound for the preparation of the epoxy-amine adduct is selected from at least one of a monoepoxide and a polyepoxide. Suitable examples for the monoepoxide and polyepoxide are the monoepoxides and polyepoxide described above for the reactive diluent as well as the epoxy resins described above for the epoxy component so that reference can be made thereto, including the preferred epoxy resins and reactive diluents.

It is preferred that the epoxy compound is a mono- or diepoxide. Examples of suitable mono- and diepoxides are described above. Preferred epoxy compounds for the preparation of the epoxy-amine adduct are p-tert butyl phenyl glycidyl ether, 2-ethylhexyl glycidyl ether, phenyl glycidyl ether, cresyl glycidyl ether, glycidyl ester of a synthetic saturated monocarboxylic acid of highly branched $C_{10}$ isomers (commercially available e.g. as Cardura™ E10 from Momentive) as monoepoxides, and bisphenol A diglycidyl ether, bisphenol F diglycidyl ether and novolac as di- or polyepoxides.

The skilled person is familiar with the preparation of epoxy-amine adducts. The reaction product of the compound of formula (I) and an epoxy compound can be easily obtained e.g. by mixing the compound of formula (I) and the epoxy compound in a suitable ratio and reacting the starting materials. The reaction can be carried out at room temperature but is preferably carried out at an elevated temperature, e.g. more than 40° C. or more than 50° C., preferably more than 60° C., in order to accelerate reaction speed. The temperature for the reaction is generally not more than 200° C., preferably not more than 120° C.

The time for completion of reaction may vary in wide ranges depending on type of starting materials and the reaction temperature, but may e.g. range from 1 to 48 hours. The reaction product obtained can be used as it is.

The compound of formula (I) and the epoxy compound are usually reacted in such a ratio that the amine hydrogen to epoxy equivalent ratio in the mixture is, depending on the functionality of the epoxide used, e.g. in the range of 0.5-4.0, preferably 0.5-2.4 for monoepoxides, and more than 4, preferably more than 6 for polyepoxides, in particular diepoxides. With respect to the polyepoxides, the mixture may also serve for dilution effects so that the upper limit may vary to a large extent depending on the desired dilution.

The hardener component may optionally comprise also furan-based amines with an amine functionality of less than 2. An example for furan-based amines with an amine functionality of less than 2 is furfurylamine.

The hardener component may optionally comprise in addition at least one further amine curing agent or other epoxy curing agents such as thiol-based curing agents. This further amine curing agent may be selected from the usual amine curing agents for curing of epoxy formulations known by the skilled person. Examples are polyamines, in particular diamines or triamines such as, e.g., aliphatic, cycloaliphatic or arylaliphatic diamines, ether group containing aliphatic diamines, aliphatic, cycloaliphatic or arylaliphatic triamines, polyoxyalkylen-di- and triamines, secondary and primary amino groups containing polyamines, secondary amino groups containing polyamines, tertiary amino groups containing polyamines, polyamidoamines, and/or epoxy-amine adducts of these polyamines or mixtures thereof.

The epoxy-amine adduct is as described above for the compound of formula (I) the reaction product of the respective polyamine, preferably diamine, with an epoxy compound selected from a polyepoxide, in particular a diepoxide, and a monoepoxide as described above.

A suitable further amine curing agent is a Mannich-base. A Mannich base is an adduct type hardener formed by the condensation of amines, in particular aliphatic amines, phenol or phenol derivatives and formaldehyde. The phenolic hydroxyl group present in these types of molecules has an accelerating effect on the epoxy-amine reaction rate, so that Mannich-bases can also be used as accelerators.

In a suitable embodiment, in particular when the epoxy-amine adduct of the invention is used as the curing agent, the hardener component further comprises a further polyamine, preferably a diamine, and/or an epoxy-amine adduct thereof, and/or an accelerator. Preferred examples of accelerators are a Mannich-base, salicylic acid, p-toluene sulfonic acid or a tertiary amine. Examples thereof and further examples for accelerators are given below for other optional additives (accelerators e)). Examples for the further polyamine, preferably a diamine, or further epoxy-amine adduct have been described above.

This further polyamine and/or epoxy-amine adduct and/or accelerator may be suitable to improve the curing speed of the hardener component, in particular if it comprises the epoxy-amine adduct of the invention. The further polyamine is preferably a diamine or a mixture thereof, such as aliphatic, cycloaliphatic or arylaliphatic diamines or ether group containing aliphatic diamines, wherein the diamine has preferably a low amine hydrogen equivalent weight, e.g. of less than 550 Dalton/NH equivalent. The accelerator accelerates the curing of the epoxy formulation. Such accelerators also discussed above are known to the skilled person. The accelerator is preferably a Mannich-base, salicylic acid or a tertiary amine. Other examples of possible accelerators are described below.

Apart from the reactive diluent and the further amine curing agent, the epoxy component and/or the hardener component can optionally contain other additives depending on the intended purpose which are common additives for such epoxy formulations. Examples for such additives which may be included in the epoxy formulation are:
a) unreactive diluents, solvents, or film-forming aids;
b) polymers such as, e.g., thermoplastic polymers;
c) inorganic and organic fillers such as, e.g., ground or precipitated calcium carbonates which are optionally coated with fatty acids, in particular stearates, baryte (heavy spar), talcs, quartz powders, quartz sand, dolomites, wollastonite, kaolins, mica, molecular sieves, aluminum oxides, aluminum hydroxides, silica, glass, cements, gypsums, fly ash, carbon black, graphite, metal powders, PVC powder or hollow spheres;
d) fibers, e.g. plastic or glass fibers; pigments, e.g., titanium dioxide or iron oxides;
e) accelerators which accelerate the reaction between amino groups and epoxy groups, e.g, acids or compounds that can be hydrolyzed to form acids, e.g organic carboxylic acids, e.g. salicylic acid, organic sulfonic acids, e.g. and p-toluene sulfonic acid, sulfonic acid esters, other organic or inorganic acids such as, e.g., phosphoric acid, or mixtures of the aforementioned acids and acid esters; phenols, e.g, phenol, alkylphenols such as nonylphenol, dodecylphenol, bisphenol A, bisphenol F, styrenated phenols, resorcinol; tertiary amines such as 1,4-diazabicyclo[2.2.2] octane, benzyldimethylamine, α-methylbenzyldimethylamine, 2-(dimethylaminomethyl)phenol or 2,4,6-tris (dimethylaminomethyl)phenol, triethanolamine, dimethylaminopropylamine, salts of such tertiary amines, quaternary ammonium salts such as, e.g., benzyltrimethylammonium chloride, as well as phosphites such as, e.g., triphenyl phosphite;
f) rheology modifiers such as in particular thickeners and anti-settling agents, for example sheet silicates such as bentonites, derivatives of castor oil, hydrogenated castor oil, polyamides, polyurethanes, urea compounds, pyrogenic silica, cellulose ethers, and hydrophobically modified polyoxyethylenes;
g) adhesion promoters, e.g., organoalkoxysilanes;
h) heat, light, UV radiation stabilizers and anti-oxidants;
i) flame retardants;
j) surfactants such as, e.g., wetting agents, flow-control agents, degassers or defoamers;
k) biocides such as, e.g., algicides, fungicides or mold growth inhibitors; and
l) anti-static agents.

While additives such as solvents and low molecular weight accelerators may be used, it is preferred that the room temperature or low temperature curable epoxy formulation is a low VOC epoxy formulation, wherein the epoxy formulation preferably has a TVOC content after 3 days ($TVOC_3$) of less than 50 mg/m$^3$, more preferably less than 10 mg/m$^3$, still more preferably less than 5 mg/m$^3$ or still more preferably less than 1 mg/m$^3$ or even less than 0.1 mg/m$^3$ or less than 0.01 mg/m$^3$, when measured as defined in the AgBB evaluation scheme of 2010. Epoxy formulations having a $TVOC_3$ of less than 0.5 mg/m$^3$ can be considered as a VOC-free epoxy formulations.

Using the compound of formula (I) and/or its epoxy-amine adduct as a curing agent for epoxy resins enables to formulate compositions which have a greatly reduced benzyl alcohol content or are entirely free of benzyl alcohol. It is therefore preferred that the epoxy formulation contains only small amounts of benzyl alcohol or is free of benzyl alcohol. In particular, the epoxy formulation preferably contains less than 5 wt. %, more preferably less than 2 wt. %, even more preferably less than 1 wt. %, benzyl alcohol, based on the total weight of the epoxy formulation. It is particularly preferred that the epoxy formulation is benzyl alcohol-free.

In the room temperature or low temperature curable the epoxy formulation the amine hydrogen to epoxy equivalent ratio is preferably 0.8 to 1.2, more preferably 0.95 to 1.05. For the calculation of the equivalent ratio, the amine hydrogen groups (NH) and epoxy groups of all ingredients contained in the epoxy formulation such as e.g. the epoxy resin, the optional reactive diluent, and the compound of formula (I) and/or the amine-epoxide adduct thereof, the optional furan-based amines having a functionality of less than 2 and the optional further amine curing agents are considered. The optional furan-based amines having a functionality of less than 2 may be included with an amine hydrogen to epoxy equivalent ratio of e.g. 0 to 0.3 with respect to all epoxy containing compounds in the epoxy formulation.

The room temperature or low temperature curable epoxy formulation is preferably an epoxy coating composition, an epoxy flooring material, an epoxy adhesive, an epoxy grout or potting material, an epoxy sealant, a waterproofing coating composition or an epoxy composite material, wherein the epoxy formulation is more preferably an epoxy flooring or coating material.

The invention also relates to the use of a compound of formula (I) and/or the epoxy-amine adduct as described above as a room temperature or low temperature epoxy curing agent for an epoxy resin formulation, preferably a benzyl alcohol-free epoxy resin formulation, wherein the compound of formula (I) is preferably a compound of formula (II) as defined above.

In view of the excellent amine blushing or water spotting properties, compound of formula (I) and/or the epoxy-amine adduct thereof as described above can be also used as a amine blushing prevention agent.

The invention also relates to a method for coating or adhering substrates or for preparing composites using a room temperature or low temperature curable epoxy formulation of the invention, wherein the method comprises the following steps
a) mixing the epoxy component and the hardener component of the room temperature or low temperature curable epoxy formulation,
b) b1) applying the mixed epoxy formulation on a substrate; b2) applying the mixed epoxy formulation on a surface of a first substrate and contacting the coated surface with a second substrate to obtain an adhesive bond; or b3) laminating one or more substrates with the mixed epoxy formulation or embedding one or more substrates in the mixed epoxy formulation, and subsequently
c) curing the epoxy formulation at a temperature of not more than 50° C.

The substrate may be of any suitable material. If two or more substrates are used, they may be of the same or a different material. The substrate or the surface of the substrate, on which the epoxy formulation is to be applied may be, e.g., made of metal, preferably steel, plastic, wood, glass, ceramic, cement, concrete, mortar, gypsum, magnesia, asphalt or another coating, e.g. another epoxy coating.

Curing of the epoxy formulation is preferably carried out at temperature of not more than 50° C., preferably not more than 40° C., more preferably not more than 30° C. It is an advantage of the present invention, that curing can also be carried out at low temperatures, e.g. at a temperature of less than 15° C. or even less than 10° C. The epoxy formulation is preferably cured at a temperature in the range of 50° C. to 0° C. more preferably 50° C. to 5° C.

The epoxy formulations exhibit good curing speed and good surface properties of the cured product, even when curing at low temperatures, e.g. 8° C. (very little or no amine blushing). This is also achieved when the epoxy formulation is formulated as a low VOC or even VOC-free epoxy formulation and/or as a low benzyl alcohol or even benzyl alcohol-free epoxy formulation.

The epoxy formulation is therefore particular suitable for the manufacture of coatings and floorings.

EXAMPLES

The following examples are given to further illustrate, but not limit, the scope of this invention. Unless otherwise indicated, all parts and percentages are by weight.
Materials

| Abbreviation | Material | Supplier |
| --- | --- | --- |
| IPFA | isopropylidene-5,5'-bis(furfurylamine) | |
| ICA | adduct of IPFA and cresyl glycidylether | |
| Epoxide 8 | glydidyl ether of C12/C14-alcohols (Epoxide No. 8) | Air Products |
| BADGE | bisphenol A diglycidyl ether | |
| MXDA | meta-Xylylenediamine | Mitsubishi Gas Chemical |
| IPD | Isophorone diamine (Vestamine ®IPD) | Evonik |
| Paste Red | Pigment paste iron oxide red | (Sika) |
| Anc K 54 | 2,4,6-tris-(dimethylaminomethyl)-phenol), (Ancamine ®K 54) | Air Products |
| Jeffamine | Polyetheramine, average formula weight 270, Jeffamine ®RFD-270 | Huntsman |
| MPMD | 2-Methylpentamethylenediamine (Dytek ®A) | Invista |
| TMD | 2,2,4-Trimethyl-hexamethylenediamine (Vestamine ®TMD) | Evonik |
| HMF-diamine | 2,5-Bis(aminomethyl)furan | Carbosynth |
| Heloxy | o-cresyl glycidyl ether (Heloxy ®Modifier KR) | Momentive |

Methods of Measurement
Viscosity

Viscosities were determined using a Physica MCR 300 plate-plate rheometer. Operating conditions were shear rates of 10 s$^{-1}$ and 100 s$^{-1}$ at 23° C.
Water Spotting Resistance For the determination of the degree of water spotting (amine blushing), a freshly coated surface was cured under defined conditions (usually 23° C., 50% r.h. or 8° C., 80% r.h., r.h.: relative humidity) for a specified time. Then a wet sponge was put on the surface and covered. After 24 h the sponge was removed and placed on another spot on the surface. The degree of amine blushing was rated according to a relative scale. The rating was as follows

| Rating | Appearance |
| --- | --- |
| 0 | No blushing |
| 1 | Individual white spots visible |
| 2 | Surface partly covered with very thin white layer |
| 3 | Surface mostly covered with thin white layer with large number of spots without layer |
| 4 | Surface covered thin white layer with large number of spots without layer |
| 5 | Surface with medium white layer with several spots without layer |
| 6 | Surface with thick white layer with individual spots without layer |
| 7 | Entire surface covered with white layer |

Shore hardness was determined in accordance with DIN 53 505.

Pendulum hardness (König hardness) was determined on the cured test specimens at 23° C./50% r.h. in accordance with DIN 53 157.

Preparation of
isopropylidene-5,5'-bis(furfurylamine) (IPFA)

A 3-necked round bottom flask was charged with 510 ml (3.06 mol) of conc. hydrochloric acid and cooled to 5° C. in an ice bath. Under stirring 294.4 g (1.52 mol) of furfurylamine (purchased from Alfa Aesar) were added while making sure that the temperature of the mixture did not exceed 10° C. Thereupon, 352 g (3.03 mol) of acetone were added and the resulting mixture was stirred at 60° C. for 1 h. After cooling to room temperature 20% KOH solution was added until a pH value of approx. 9-10 was reached. An oil separated which was collected, dried with anhydrous sodium sulfate and distilled under vacuum (120° C., 1.3 mbar) to yield 105.27 g (30.9%) of a clear, orange-brown oil.

Amine number 465.4 g/mol (theory: 509.8 mg/g); density: 1.10 g/cm$^3$; viscosity: 123 mPas (23° C./100$^{-1}$); GC-MS (M$^+$) m/z=217.

Preparation of Epoxy-Amine Adduct for Examples 10-16

Each of the following amines were used to prepare epoxy-amine adducts: m-xylylenediamine (MXDA), 1,3-bisaminomethyl cyclohexane (1,3-BAC), Jeffamine®RFD-270 and 5,5-isopropylidenedifurfurylamine (IPFA, as prepared above). The respective amine (1.52 mol) and bisphenol-A diglycidylether (0.1 mol) were placed in a can and mixed with a dissolver (930 U/min). Thereafter the can was placed overnight at 80° C. in an oven. The adduct was used without further purification.

Examples 1 to 9

The influence of benzyl alcohol and accelerator on an IPFA-based model system according to the invention (Examples 1 to 4) was tested, relative to two commonly used diamines, isophorone diamine and metaxylylene diamine as a reference (Examples 5 to 9). IPFA as prepared above was used.

Epoxy components A and hardener components B were prepared by mixing the ingredients in the amounts as shown in Table 1. The amounts are given in parts by weight. For the application of 2-component samples components A and B were mixed in a Speed Mixer. Films were applied on glass plates with a doctor blade using a clearance of 500 μm. Films were cured for a minimum of 7 days at 23° C./50% r.h. or 8° C., 80% r.h., respectively. König hardness was determined after 1d, 2d, 3d, 7d and 28d of curing. Water spotting was determined after 1d, 2d and 7d of curing. The results are also given in Table 1.

both a similar hardness and had a very good curing speed. The MXDA-based film, on the other hand, gave much softer films with a lower final hardness (28 days). Neither addition of benzyl alcohol nor of accelerator could improve the water

TABLE 1

|  |  | Ex. 1 | Ex. 2 | Ex. 3 | Ex. 4 | Ex. 5* | Ex. 6* | Ex. 7* | Ex. 8* | Ex. 9* |
|---|---|---|---|---|---|---|---|---|---|---|
| Component A | | | | | | | | | | |
| BADGE | | 60.00 | 60.00 | 60.00 | 60.00 | 60.00 | 60.00 | 60.00 | 60.00 | 60.00 |
| Epoxide 8 | | 11.41 | 11.41 | 11.41 | 11.41 | 11.41 | 11.41 | 11.41 | 11.41 | 11.41 |
| Paste Red | | 3.76 | 3.76 | 3.76 | 3.76 | 3.76 | 3.76 | 3.76 | 3.76 | 3.76 |
| Component B | | | | | | | | | | |
| benzyl alcohol | | | 10.75 | | 10.85 | | | 9.74 | 10.10 | |
| IPFA | | 21.55 | 21.55 | 21.55 | 21.55 | | | | | |
| MXDA | | | | | | 12.53 | | 12.53 | | 12.53 |
| IPD | | | | | | | 15.70 | | 15.70 | |
| Anc K54 | | | | 0.97 | 0.97 | | | | | 0.88 |
| Results | | | | | | | | | | |
| König hardness | 1 d | 8.4 | 0.0 | 0.0 | 0.0 | 0.0 | 0.0 | 0.0 | 0.0 | 0.0 |
| [s], 8° C. | 2 d | 50.9 | 5.6 | 63.9 | 9.8 | 4.2 | 21.0 | 7.0 | 8.4 | 8.4 |
|  | 3 d | 65.3 | 7.0 | 97.1 | 18.2 | 7.0 | 41.1 | 12.6 | 29.4 | 11.2 |
|  | 7 d | 70.5 | 8.4 | 96.6 | 68.1 | 7.0 | 59.7 | 12.6 | 65.8 | 12.6 |
|  | 28 d | 106.4 | 22.4 | 133.0 | 79.3 | 15.4 | 109.2 | 12.6 | 109.2 | 24.0 |
| König hardness | 1 d | 150.7 | 15.4 | 162.4 | 46.7 | 33.6 | 98.9 | 29.4 | 32.2 | 71.4 |
| [s], 23° C. | 2 d | 187.6 | 26.5 | 192.3 | 70.9 | 42.9 | 177.8 | 38.7 | 112.0 | 86.8 |
|  | 3 d | 197.9 | 33.6 | 208.6 | 85.4 | 45.7 | 203.5 | 42.0 | 137.2 | 99.9 |
|  | 7 d | 201.0 | 55.5 | 214.2 | 86.3 | 50.4 | 217.0 | 49.0 | 160.5 | 114.3 |
|  | 28 d | 211.4 | 133.7 | 224.0 | 129.3 | 83.5 | 220.7 | 83.1 | 172.7 | 151.7 |
| Water spotting | 1 d | 0 | 0 | 1 | 0 | 4 | 3 | 4 | 5 | 2.5 |
| 8° C. | 2 d | 0 | 0 | 0 | 0 | 2.5 | 2 | 4 | 2 | 2 |
|  | 7 d | 0 | 0 | 0 | 0 | 1.5 | 1.5 | 2 | 2 | 1.5 |
| Water spotting | 1 d | 0 | 0 | 0 | 0 | 2.5 | 5.5 | 5 | 2 | 4.5 |
| 23° C. | 2 d | 0 | 0 | 0 | 0 | 2 | 3 | 3.5 | 2 | 3 |
|  | 7 d | 0 | 0 | 0 | 0 | 2 | 2 | 2 | 2 | 2 |

*Reference example

The results clearly show that cure solely with isopropylidene-5,5'-bis(furfurylamine) (IPFA) (Example 1) gave good surfaces without water spotting at 8 and 23° C. even without benzyl alcohol. Addition of benzyl alcohol and/or accelerator (Ancamine K54) could not improve the surfaces (Examples 2 to 4). The addition of approx. 10% of benzyl alcohol gave softer films (Examples 2 and 4). Addition of accelerator improved the surface hardness at 8° C., whereas the hardness gain at 23° C. was minimal and the final hardness (28 days) was the same.

Comparing the films cured with IPFA (Example 1) compared to films cured with common amine curing agents (MXDA; Example 5, and IPD; Example 6), the difference in water spotting is obvious: whereas the IPFA-based films showed no water spotting, neither at 8 nor at 23° C., the IPD and MXDA-based films had severe water spotting. In terms of pendulum hardness the IPFA and IPD-based films showed spotting tendency of the MXDA and IPD films (Example 7 to 9) to the level of the IPFA-based films (Examples 1-4).

Examples 10 to 16

The curing properties of the epoxy-amine adducts as hardener component prepared as described above were tested (Examples 10 to 16). In examples 11, 13 and 15 IPFA as such was also added. Epoxy components A and hardener components B were prepared by mixing the ingredients in the amounts as shown in Table 2. The amounts are given in parts by weight. For the application of 2-component samples the components A and B were mixed in a Speed Mixer. Films were applied on glass plates with a doctor blade using a clearance of 500 μm. Films were cured for a minimum of 7 days at 23° C./50 r.h. or 8° C., 80% r.h., respectively. König hardness and water spotting were determined as in Examples 1 to 9. The results are also given in Table 2.

TABLE 2

|  | Ex. 10* | Ex. 11 | Ex. 12* | Ex. 13 | Ex. 14* | Ex. 15 | Ex. 16 |
|---|---|---|---|---|---|---|---|
| Component A | | | | | | | |
| BADGE | 100.00 | 100.00 | 100.00 | 100.00 | 100.00 | 100.00 | 100.00 |
| Epoxide 8 | 19.02 | 19.02 | 19.02 | 19.02 | 19.02 | 19.02 | 19.02 |
| Paste Red | 1.20 | 1.20 | 1.20 | 1.20 | 1.20 | 1.20 | 1.20 |
| Component B | | | | | | | |
| Adduct (epoxy part) | | | | | | | |
| BADGE | 7.99 | 3.99 | 7.99 | 3.99 | 7.99 | 3.99 | 7.97 |

TABLE 2-continued

|  |  | Ex. 10* | Ex. 11 | Ex. 12* | Ex. 13 | Ex. 14* | Ex. 15 | Ex. 16 |
|---|---|---|---|---|---|---|---|---|
| (amine part) | | | | | | | | |
| MXDA | | 22.07 | 11.03 | | | | | |
| 1,3-BAC | | | | 22.32 | 11.52 | | | |
| Jeffamine | | | | | | 43.48 | 21.74 | |
| IPFA | | | | | | | | 35.63 |
| IPFA | | | 16.65 | | 16.68 | | 16.67 | |
| Results | | | | | | | | |
| König | 1 d | 0 | 0 | 0 | 0 | 0 | 0 | 0 |
| hardness | 2 d | 0 | 0 | 0 | 0 | 0 | 0 | 0 |
| [s], 8° C. | 3 d | 0 | 34 | 33 | 20 | 0 | 0 | 50 |
|  | 7 d | 0 | 38 | 36 | 17 | 0 | 20 | 73 |
|  | 28 d | 0 | — | 26 | 15 | 17 | 24 | 92 |
| König | 1 d | 58 | 95 | 111 | 75 | 50 | 90 | 136 |
| hardness | 2 d | 71 | 112 | 132 | 90 | 149 | 161 | 171 |
| [s], 23° C. | 3 d | 78 | 119 | 144 | 93 | 179 | 174 | 178 |
|  | 7 d | 85 | 130 | 95 | 108 | 183 | 175 | 188 |
|  | 28 d | 99 | 143 | 123 | 99 | 173 | 181 | 201 |
| Water | 1 d | 2.5 | 2.5 | 2.5 | 4 | 3 | 2.5 | 0 |
| spotting | 2 d | 1 | 2 | 2 | 3 | 2 | 2 | 0 |
| 8° C. | 7d | 0 | 2 | 2 | 2.5 | 2 | 2 | 0 |
| Water | 1 d | 2.5 | 2 | 1.5 | 1 | 0 | 0 | 0 |
| spotting | 2 d | 0.5 | 1 | 0 | 0 | 0 | 0 | 0 |
| 23° C. | 7 d | 0 | 1 | 0 | 0 | 0 | 0 | 0 |

*Reference example

The results show that the adduct prepared from bisphenol-A diglycidylether and IPFA according to the invention has much less tendency to water spotting, (Example 16) compared to adducts of conventional amines curing agents. Especially at 8° C. the water spotting resistance of this adduct is superior to adducts prepared from conventional amines (Examples 10, 12, 14); also curing speed and hardness are improved. The examples also show that the properties of formulations comprising adducts prepared from non-furan-based amines can be improved by using IPFA as part of the curing agent (Examples 11, 13, 15); this is most obvious for the formulations using MXDA and Jeffamine® RFD-270-based adducts (Examples 11, 15).

Examples 17 to 20

The amines 2,5-bis(aminomethyl)furan (HMF-diamine) and isophorone diamine (IPD) and the epoxy compounds bisphenol A diglycidyl ether (BADGE) and o-cresyl glycidyl ether (Heloxy), respectively, were reacted in the amounts given in Table 3 to prepare epoxy-amine adducts. Table 3 also includes the abbreviations used in the following for the adducts prepared.

The respective amine and the respective epoxide were mixed in a vial and placed overnight at 40° C. in an oven. The adducts were used without further purification.

TABLE 3

| (amounts in parts by weight) | | | | |
|---|---|---|---|---|
|  | Ex. 17 | Ex. 18 | Ex. 19* | Ex. 20* |
| Designation | HMF-ADD-F | HMF-ADD-C | IPDA-ADD-F | IPDA-ADD-C |
| Part A | | | | |
| BADGE | 28.097 | | 22.417 | |
| Heloxy | | 59.157 | | 51.714 |

TABLE 3-continued

| (amounts in parts by weight) | | | | |
|---|---|---|---|---|
|  | Ex. 17 | Ex. 18 | Ex. 19* | Ex. 20* |
| Part B | | | | |
| HMF-diamine | 71.903 | 40.843 | | |
| IPD | | | 77.583 | 48.286 |
| Stoichiometric ratio NH/epoxy [%] | 1520 | 400 | 1520 | 400 |

*Reference example

Examples 21 to 26

The curing properties of the epoxy-amine adducts prepared above (Ex. 17-20), as well as unmodified amines 2,5-bis(aminomethyl)furan (HMF-diamine) and isophorone diamine (IPD) were tested as hardener component.

Epoxy components A and hardener components B were prepared by mixing the ingredients in the amounts as shown in Table 4. For the application of 2-component samples the components A and B were mixed in a Speed Mixer for 1 min. Films were applied on glass panel with a doctor blade using a clearance of 500 µm. Films were cured for a minimum of 7 days at 23° C./50%/0 r.h. König hardness and water spotting were determined as in Examples 1 to 9. The results are also given in Table 4.

TABLE 4

|  | Ex. 21 | Ex. 22* | Ex. 23 | Ex. 24* | Ex. 25 | Ex. 26* |
|---|---|---|---|---|---|---|
| Component A | | | | | | |
| BADGE [g] | 100.00 | 100.00 | 100.00 | 100.00 | 100.00 | 100.00 |
| Epoxide 8 [g] | 19.02 | 19.02 | 19.02 | 19.02 | 19.02 | 19.02 |
| Paste Red [g] | 1.20 | 1.20 | 1.20 | 1.20 | 1.20 | 1.20 |

TABLE 4-continued

| | | Ex. 21 | Ex. 22* | Ex. 23 | Ex. 24* | Ex. 25 | Ex. 26* |
|---|---|---|---|---|---|---|---|
| Component B | | | | | | | |
| HMF-ADD-F [g] | | 28.404 | | | | | |
| IPDA-ADD-F [g] | | | 35.611 | | | | |
| HMF-ADD-C [g] | | | | 58.52 | | | |
| IPDA-ADD-C [g] | | | | | 66.94 | | |
| HMF-diamine [g] | | | | | | 19.08 | |
| IPD [g] | | | | | | | 25.80 |
| Results | | | | | | | |
| König | 1 d | 7 | 127 | 57 | 38 | 14 | 119 |
| hard- | 2 d | 8 | 179 | 77 | 120 | 20 | 170 |
| ness [s], | 3 d | 11 | 187 | 88 | 155 | 24 | 190 |
| 23° C. | 7 d | 29 | 200 | 139 | 192 | 62 | 200 |
| | 28 d | 126 | 213 | 160 | 202 | 135 | 205 |
| Water | 1 d | 0.5 | 3 | 0.5 | 0.5 | 2.5 | 4.5 |
| spotting | 2 d | 0.5 | 2.5 | 0 | 0.5 | 1.5 | 4.5 |
| 23° C. | 3 d | 0.5 | 2 | 0 | 0 | 1 | 4 |
| | 7 d | 0.5 | 1 | 0 | 0 | 1 | 3.5 |

*Reference example

The water spotting resistance (carbamatization resistance) of the HMF-diamine-based films (Ex. 21, 23 and 25) at 23° C. was better than the water spotting resistance of the corresponding IPD-based films (Ex. 22, 24 and 26).

The invention claimed is:

1. A room temperature or low temperature curable epoxy formulation comprising
   a) an epoxy component comprising at least one epoxy resin and
   b) a hardener component comprising
   at least one epoxy-amine adduct, which is a reaction product of a compound of formula (I) and an epoxy compound selected from at least one of a monoepoxide and/or a polyepoxide,
   as a curing agent

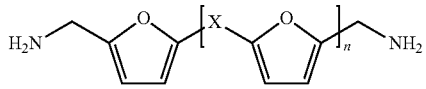

(I)

wherein X is a divalent hydrocarbon group, which optionally contains one or more heteroatoms, and n is 0, 1, 2 or 3.

2. The room temperature or low temperature curable epoxy formulation according to claim 1, wherein for the epoxy-amine adduct, the compound of formula (I) is a compound of formula (I), wherein n is 0, or a compound of formula (II)

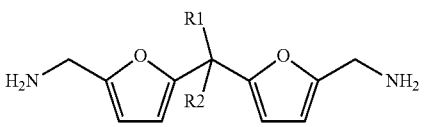

(II)

wherein $R^1$ and $R^2$ are the same or different and selected from the group consisting of hydrogen, an alkyl group, which may be substituted, a cycloalkyl group, which may be substituted, and an aryl group, which may be substituted.

3. The room temperature or low temperature curable epoxy formulation according to claim 2, wherein the compound of formula (I) is the compound of formula (II) in which $R^1$ is H and $R^2$ is methyl (IIb); $R^1$ is H and $R^2$ is phenyl (IIc); $R^1$ and $R^2$ are both methyl (IId); $R^1$ is methyl and $R^2$ is ethyl (IIe); or $R^1$ is methyl and $R^2$ is isobutyl (IIf).

4. The room temperature or low temperature curable epoxy formulation according to claim 2, wherein $R^1$ and $R^2$ in formula (II) are the same or different and selected from the group consisting of hydrogen, methyl, ethyl, n-propyl, isopropyl, n-butyl, isobutyl, pentyl, hexyl, benzyl, or phenyl, which may be substituted, provided that $R^1$ and $R^2$ are not both hydrogen.

5. The room temperature or low temperature curable epoxy formulation according to claim 1, wherein the epoxy formulation has a TVOC content after 3 days ($TVOC_3$) of less than 50 mg/m$^3$, when measured as defined in the AgBB evaluation scheme of 2010, wherein TVOC means Total Volatile Organic Compounds which is defined as the sum of the concentration of all individual substances with concentrations equal to or greater than 5 µg/m$^3$ within the retention range $C_6$-$C_{16}$, and the AgBB evaluation scheme of 2010 is an evaluation scheme developed by AgBB (German Committee for Health-related Evaluation of Building Products).

6. The room temperature or low temperature curable epoxy formulation according to claim 1, wherein the epoxy formulation has a benzyl alcohol content of less than 5% by weight.

7. The room temperature or low temperature curable epoxy formulation according to claim 1, wherein the amine hydrogen to epoxy equivalent ratio is 0.8 to 1.2.

8. The room temperature or low temperature curable epoxy formulation according to claim 1, wherein the hardener component further comprises at least one further polyamine, and/or at least one epoxy-amine adduct thereof, and/or at least one accelerator.

9. The room temperature or low temperature curable epoxy formulation according to claim 1, wherein the epoxy formulation is an epoxy coating composition, an epoxy flooring material, an epoxy adhesive, an epoxy grout or potting material, an epoxy sealant, a waterproofing coating composition or an epoxy composite material.

10. A method for coating or adhering substrates or for preparing composites using a room temperature or low temperature curable epoxy formulation according to claim 1, the method comprising
    a) mixing the epoxy component and the hardener component of the room temperature or low temperature curable epoxy formulation,
    b) b1) applying the mixed epoxy formulation on a substrate; b2) applying the mixed epoxy formulation on a surface of a first substrate and contacting the coated surface with a second substrate to obtain an adhesive bond; or b3) laminating one or more substrates with the mixed epoxy formulation or embedding one or more substrates in the mixed epoxy formulation, and subsequently
    c) curing the epoxy formulation at a temperature of not more than 50° C.

11. Cured article obtainable according to the method of claim 10.

* * * * *